United States Patent
Kirchhoff et al.

(10) Patent No.: US 11,263,540 B2
(45) Date of Patent: Mar. 1, 2022

(54) MODEL SELECTION INTERFACE

(71) Applicant: XNOR.ai, Inc., Seattle, WA (US)

(72) Inventors: Alexander James Oscar Craver Kirchhoff, Seattle, WA (US); Ali Farhadi, Seattle, WA (US); Anish Jnyaneshwar Prabhu, Seattle, WA (US); Carlo Eduardo Cabanero del Mundo, Seattle, WA (US); Daniel Carl Tormoen, Seattle, WA (US); Hessam Bagherinezhad, Seattle, WA (US); Matthew S. Weaver, Bellevue, WA (US); Maxwell Christian Horton, Seattle, WA (US); Mohammad Rastegari, Bothell, WA (US); Robert Stephen Karl, Jr., Seattle, WA (US); Sophie Lebrecht, Seattle, WA (US)

(73) Assignee: APPLE INC., Cupertino, CA (US)

( * ) Notice: Subject to any disclaimer, the term of this patent is extended or adjusted under 35 U.S.C. 154(b) by 428 days.

(21) Appl. No.: 16/404,023

(22) Filed: May 6, 2019

(65) Prior Publication Data
US 2019/0340524 A1 Nov. 7, 2019

Related U.S. Application Data

(60) Provisional application No. 62/667,991, filed on May 7, 2018.

(51) Int. Cl.
*G06N 5/04* (2006.01)
*G06F 11/34* (2006.01)
(Continued)

(52) U.S. Cl.
CPC ............. *G06N 5/043* (2013.01); *G06F 8/10* (2013.01); *G06F 8/41* (2013.01); *G06F 11/3428* (2013.01);
(Continued)

(58) Field of Classification Search
None
See application file for complete search history.

(56) References Cited

U.S. PATENT DOCUMENTS 8,087,015 B2 * 12/2011 Pogrebinsky ........... H04L 67/10
717/172
9,582,254 B2 * 2/2017 Krishnamurthy ......... G06F 8/20
(Continued)

FOREIGN PATENT DOCUMENTS

WO WO 2013079006 A1 6/2013

OTHER PUBLICATIONS

Aryal et al., "Dynamic application deployment in federations of clouds and edge resources using a multiobjective optimization AI algorithm," IEEE, 2018, 8pg. (Year: 2018).*
(Continued)

*Primary Examiner* — Ryan D. Coyer
(74) *Attorney, Agent, or Firm* — Morgan, Lewis & Bockius LLP

(57) ABSTRACT

In one embodiment, a method includes providing, to a client system of a user, a user interface for display. The user interface may include a first set of options for selecting an artificial intelligence (AI) task for integrating into a user application, a second set of options for selecting one or more devices on which the user wants to deploy the selected AI task, and a third set of options for selecting one or more performance constraints specific to the selected devices. User specifications may be received based on user selections in the first, second, and third sets of options. A custom AI model may be generated based on the user specifications and sent to the client system of the user for integrating into the user application. The custom AI model once integrated may enable the user application to perform the selected AI task on the selected devices.

20 Claims, 6 Drawing Sheets

(51) Int. Cl.
  *H04N 5/232*  (2006.01)
  *G06F 8/41*  (2018.01)
  *G06F 8/10*  (2018.01)

(52) U.S. Cl.
  CPC ..... *H04N 5/23216* (2013.01); *H04N 5/23219* (2013.01)

(56) References Cited

U.S. PATENT DOCUMENTS

| | | | |
|---|---|---|---|
| 2005/0216560 A1* | 9/2005 | Pohja | H04L 67/34 |
| | | | 709/205 |
| 2010/0114618 A1 | 5/2010 | Wilcock | |
| 2012/0185867 A1* | 7/2012 | Archer | G06F 9/5066 |
| | | | 718/105 |
| 2012/0310618 A1 | 12/2012 | B'far | |
| 2013/0086594 A1* | 4/2013 | Cottrell | H04L 61/35 |
| | | | 719/313 |
| 2014/0279764 A1* | 9/2014 | Lahr | G06K 9/00771 |
| | | | 706/12 |
| 2015/0134684 A1* | 5/2015 | Montana | H04L 67/2819 |
| | | | 707/758 |
| 2015/0170053 A1 | 6/2015 | Miao | |
| 2016/0170742 A1 | 6/2016 | Pallath et al. | |
| 2017/0308800 A1 | 10/2017 | Cichon | |
| 2017/0357893 A1 | 12/2017 | Dexter et al. | |
| 2018/0357047 A1* | 12/2018 | Brown | G06N 3/08 |

OTHER PUBLICATIONS

Chung et al., "Serving DNNs in Real Time at Datacenter Scale with Project Brainwave," IEEE, 2018, 13pg. (Year: 2018).*
Kiss et al., "Deployment of IoT applications on 5G Edge," IEEE, 2018, 9pg. (Year: 2018).*
Zhang et al., "A Comparison of Distributed Machine Learning Platforms," IEEE, 2017, 9pg. (Year: 2017).*
International Search Report and Written Opinion for International Application No. PCT/US2019/031160, dated Aug. 23, 2019.
Extended European Search Report from European Patent Application No. 19800091.1, dated Nov. 29, 2021, 9 pages.

* cited by examiner

MODEL SELECTION INTERFACE

PRIORITY

This application claims the benefit, under 35 U.S.C. § 119(e), of U.S. Provisional Patent Application No. 62/667,991, filed 7 May 2018, which is incorporated herein by reference.

TECHNICAL FIELD

This disclosure generally relates to creation and management of artificial intelligence (AI) models, and more particularly to systems and methods for enabling users to incorporate AI technology into their applications and devices via custom AI models.

BACKGROUND

Artificial intelligence (AI) makes it possible for computing devices/machines to learn from experience, adjust to new inputs, and perform human-like tasks, such as for example, chess-playing computers, self-driving cars, object detection, image tagging, speech-to-text recognition, scene recognition, etc. The AI technology relies heavily on deep learning and neural network models. Using the AI technology, computers can be trained to accomplish specific tasks by processing large amounts of data and recognizing patterns in the data. This processing of the large amounts of data may be achievable by the equivalent of supercomputers. Because of this, it is quite challenging to apply AI in small or low-computing devices, such as smartphones, tablets, embedded sensors, cameras, smartwatches, etc. Furthermore, developers associated with these types of devices may not be trained and/or have knowledge on how to implement AI into software/applications intended to run on these small/low-computing devices. Thus, there is a need for a mechanism that can enable these developers to easily integrate AI functionality into their applications.

SUMMARY OF PARTICULAR EMBODIMENTS

In particular embodiments, a computing system, such as a model-management system may enable users (e.g., developers) to easily integrate artificial intelligence (AI) into their applications (e.g., software). The model-management system may provide a user-friendly interface (see FIG. 1) using which a user may provide their specifications. The user specifications may include, for example, selection of an AI task (e.g., object detection, scene recognition, image tagging, etc.) that they are looking to integrate into their application, device(s) on which they want to deploy the AI task, and one or more performance constraints (e.g., memory, latency, power, etc.) specific to the selected devices. Based on the user specifications, the model-management system may generate a custom AI model, which is integrable into the user application and operable on user specified devices. The model-management system may generate the custom AI model by retrieving a raw or a high-level model from a database containing a plurality of AI models. The high-level model may be compiled to generate a model binary. In particular embodiments, the model binary may be created by removing unnecessary components from the retrieved model and adding one or more components as per the user specifications. The model-management system may bind one or more interface functions with the model binary. The one or more interface functions may be functions associated with the AI task selected by the user. For example, if the task is image tagging, then an interface function is a set of tags contained with an image. Responsive to binding the interface function(s) with the model binary, the model-management system may convert the model binary into a device-level model configured to operate on device(s) selected by the user. For example, the device-level model may be configured for an iPhone as specified by the user at query time. The device-level model may finally be provided to the user in the form of a downloadable link, which the user can download to integrate the desired AI functionality into their application.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system, such as a model-management system 200 may enable users (e.g., developers) to easily integrate artificial intelligence (AI) into their applications (e.g., software). The model-management system 200 may provide a user-friendly interface (see FIG. 1) using which a user may provide their specifications. The user specifications may include, for example, selection of an AI task (e.g., object detection, scene recognition, image tagging, etc.) that they are looking to integrate into their application, device(s) on which they want to deploy the AI task, and one or more performance constraints (e.g., memory, latency, power, etc.) specific to the selected devices. Based on the user specifications, the model-management system 200 may generate a custom AI model, which is integrable into the user application and operable on user specified devices. The model-management system 200 may generate the custom AI model by retrieving a raw or a high-level model from a database containing a plurality of AI models. The high-level model may be compiled to generate a model binary. In particular embodiments, the model binary may be created by removing unnecessary components from the retrieved model and adding one or more components as per the user specifications. The model-management system 200 may bind one or more interface functions with the model binary. The one or more interface functions may be functions associated with the AI task selected by the user. For example, if the task is image tagging, then an interface function is a set of tags contained with an image. Responsive to binding the interface function(s) with the model binary, the model-management system 200 may convert the model binary into a device-level model configured to operate on device(s) selected by the user. For example, the device-level model may be configured for an iPhone as specified by the user at query time. The device-level model may finally be provided to the user in the form of a downloadable link, which the user can download to integrate the desired AI functionality into their application.

Figure 1:
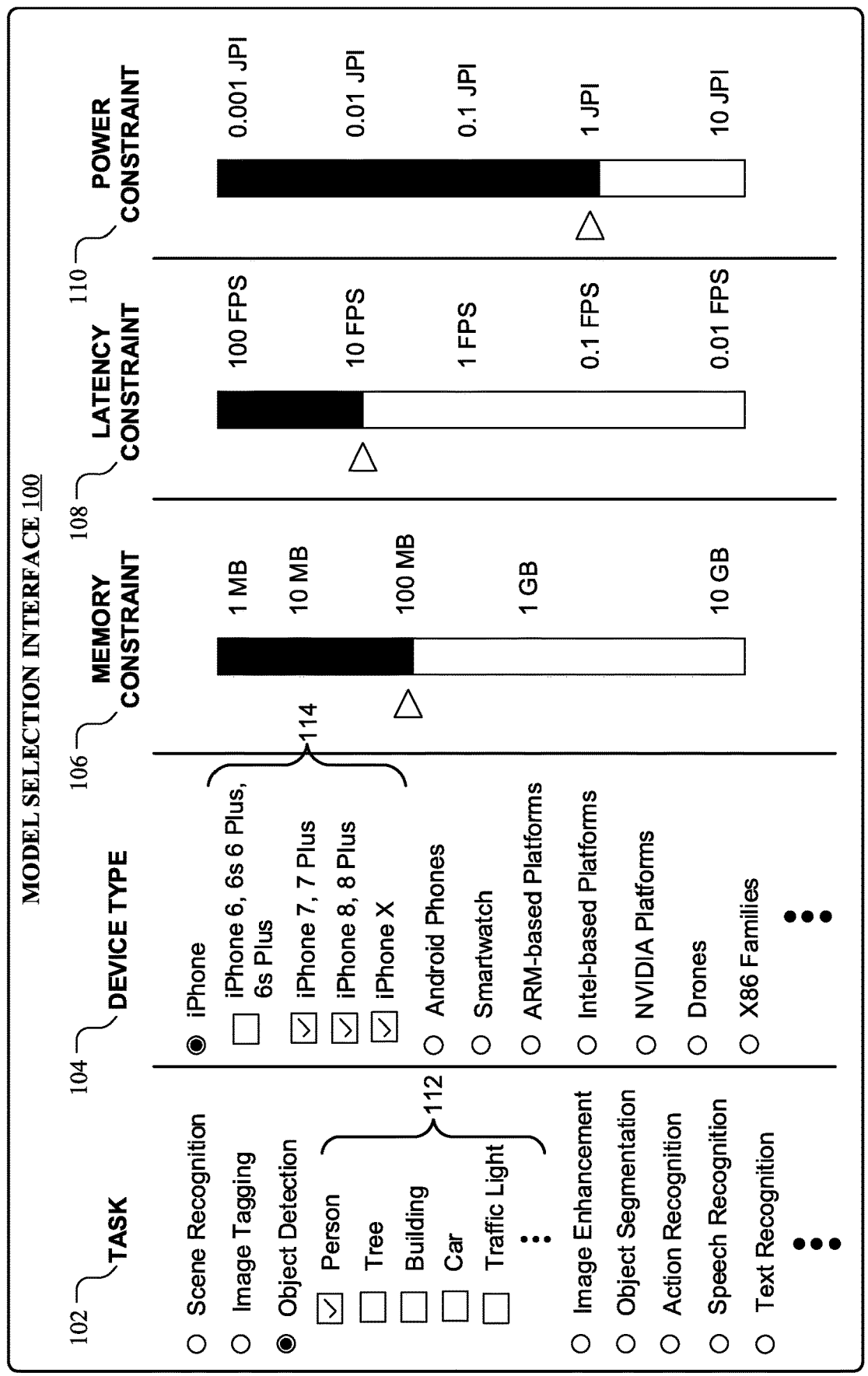
FIG. 1 illustrates an example interface for defining user specifications.

FIG. 1 illustrates an example interface 100 for defining user specifications. In some embodiments, the interface 100 may be presented within a web browser. For instance, the user may go to a website where they are presented with the user interface 100 within their web browser. As depicted, the user interface 100 may offer a variety of menus 102-110, options within these menus, and sub-options or categories 112-114, which the user may select in order to achieve the desired AI functionality for their application. It should be noted that the user interface shown here is for exemplary purposes and is not by any means limited to the menus, options, and sub-options illustrated herein. A variety of other menus, options, and sub-options are possible and within the scope of the present disclosure.

As shown in FIG. 1, the interface 100 may include a task menu 102, a device-type menu 104, and constraint menus 106-110. The task menu 102 may include a variety of AI tasks from which the user may select a desired task to incorporate into their application. As an example and without limitation, the tasks may include scene recognition, image tagging, object detection, object tracking, object segmentation, human pose estimation, image enhancement, action recognition, human emotion recognition, speech recognition, text recognition, natural language understanding, and/or any sort of data processing tasks. In particular embodiments, one or more categories 112 may be included within one or more of these tasks. The one or more categories within a task may include specific objects or items of interest that a user may want to particularly focus on. For example, categories within the object detection task may include person, tree, automobile, bicycle, dog, building, etc. As another example, categories within the scene recognition task may include beach, snowy mountains, flowers, buildings, autumn leaves, waterfall, night scene, etc. Yet as another example, categories within the image enhancement task may include denoising, super-resolution, etc.

The device-type menu 104 may include different types of user devices on which a given task (e.g., task selected from task menu 102) may be deployed. As an example and not by way of limitation, the user devices may include smartphones (e.g., various iPhone and Android models), tablets (e.g., Apple iPads, Amazon Kindle, etc.), smartwatches (e.g., Apple Watch, Samsung Gear, etc.), ARM-based platforms (e.g., Raspberry Pi, NanoPi, etc.), embedded sensors, cameras, intel-based platforms, drones, snapdragon based platforms, NVIDIA-based platforms (e.g., various GPUs), X-86 families, ambarella platforms, etc. From the list of user devices, the user may select a device on which they want the chosen task to be deployed. In other words, the user may select one or more devices targeted specific to their application. By way of an example, the user may be developing an object-detection application specific to iPhone users and therefore, the user may select particular iPhone model(s) from the device-type menu 104.

The constraint menus 106-110 may include a memory-constraint menu 106, a latency-constraint menu 108, and a power-constraint menu 110. The memory-constraint menu 106 may enable the user to specify amount of memory to be used for their selected task. For example, as shown in the figure, the user may choose to allocate 100 MB memory for the object detection task. The latency-constraint menu 108 may enable the user to specify a refresh rate or frames per second (FPS) at which they want their task to run. For example, as shown in the figure, the user may choose to run the object detection task at 10 FPS. The power-constraint menu 110 may enable the user to specify amount of power to be utilized by their selected task. For example, as shown in the figure, the user may choose to allocate 1 JPI power for the object detection task.

Figure 2A:
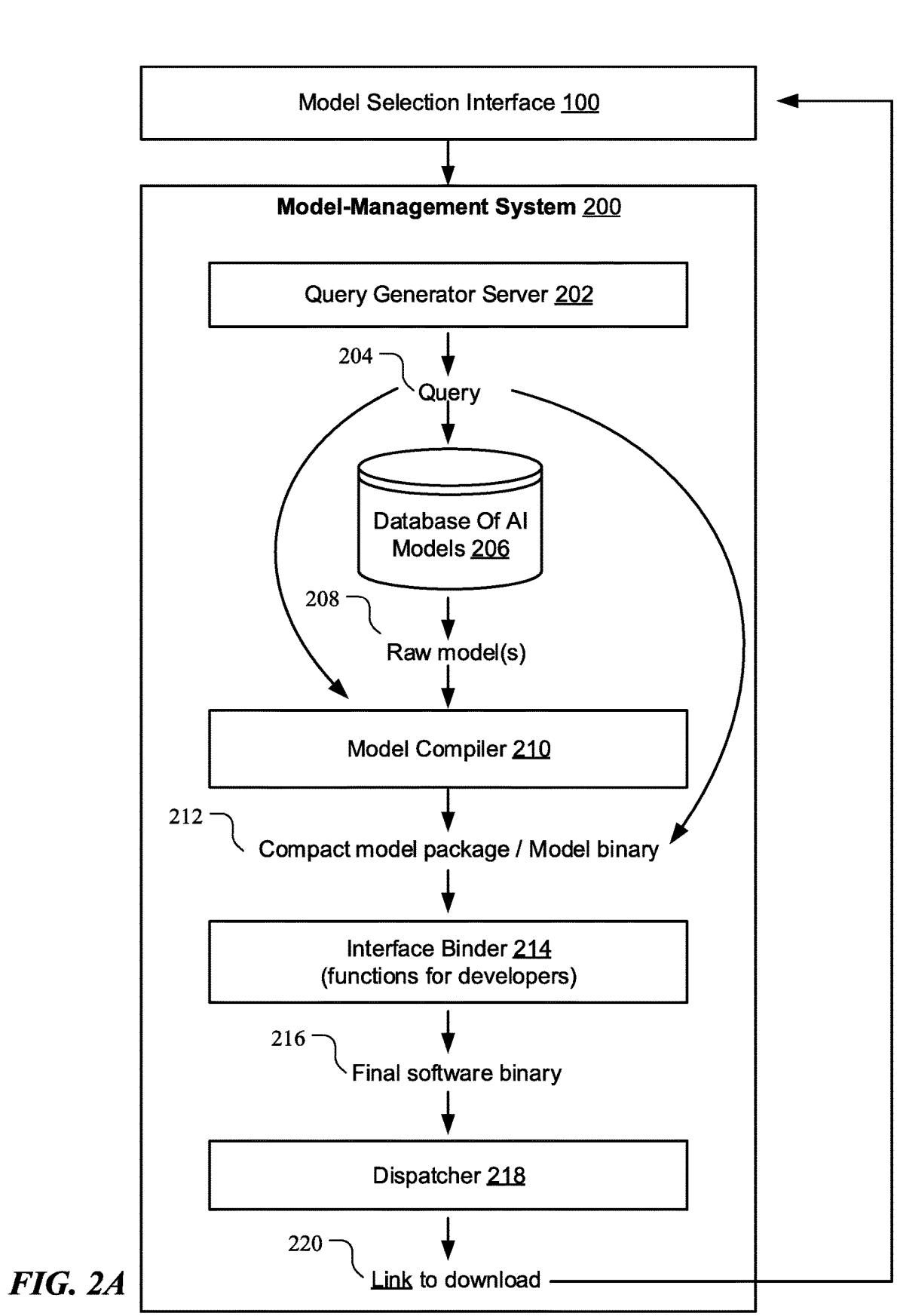
FIG. 2A illustrates various components of a model-management system and their associated functionalities for dispatching an appropriate AI model as per user specifications.

FIG. 2A illustrates various components of a model-management system 200 and their associated functionalities for dispatching an appropriate AI model as per user specifications. Once the user has defined their specifications (e.g., task, device type, memory constraint, power constraint, latency constraint) using the interface discussed in FIG. 1, the user specifications may be sent to a query generator server 202. The query generator server 202 receives the user specifications and generates a query 204, which may be used to retrieve one or more raw models 208 (or device-level models) from a database 206. The device-level models may be defined in certain programming languages. For example, a device-level model may be defined in Python language. The database 206 may include a plurality of AI models that may be defined and stored based on previous user specifications. The previous user specifications may or may not be related to the current user specification. As an example, a previous user specification may be relating to an image tagging task for an application targeted to operate on Android phones and the model-management system 200 generated a model as per this specification and stored the model in the database 206 for future access and/or retrieval. Storing previous models or having this database of models is advantageous as it may avoid creating a model from scratch and existing model(s) may be reused and tweaked to match the current user specifications.

The raw or high-level model 208 retrieved from the database 206 may be processed by a model compiler 210 to make it appropriate as per the current user specification. For instance, the model compiler 210 may compile the model to remove out any unnecessary modules/components and add any required components to match the user specification. As an example, the raw model may be previously generated based on a user specification such as, task: object detection, device type: Android, memory constraint: 1 GB, latency constraint: 100 FPS, power constraint: 1 JPI, and some additional constraints. The model compiler 210 may compile this raw model to remove out the additional constraints and change the device type to iPhones and memory constraint to 100 MB to make the model appropriate for the current user specification. In particular embodiments, the output of the model compiler 210 is a compact model package or model binary 212. In particular embodiments, compiling the raw model basically converts the high-level or raw model into a model binary, which may also include the user query, as shown in FIG. 2A.

An interface binder 214 may bind the compact model/model binary with one or more interface functions. An interface function may be a function that an actual user will use in the application or software once the model is deployed into the application. For example, for performing the task of image tagging, the interface function may process the input images and the output of this function will be a bunch of tags within the images.

Figure 3:
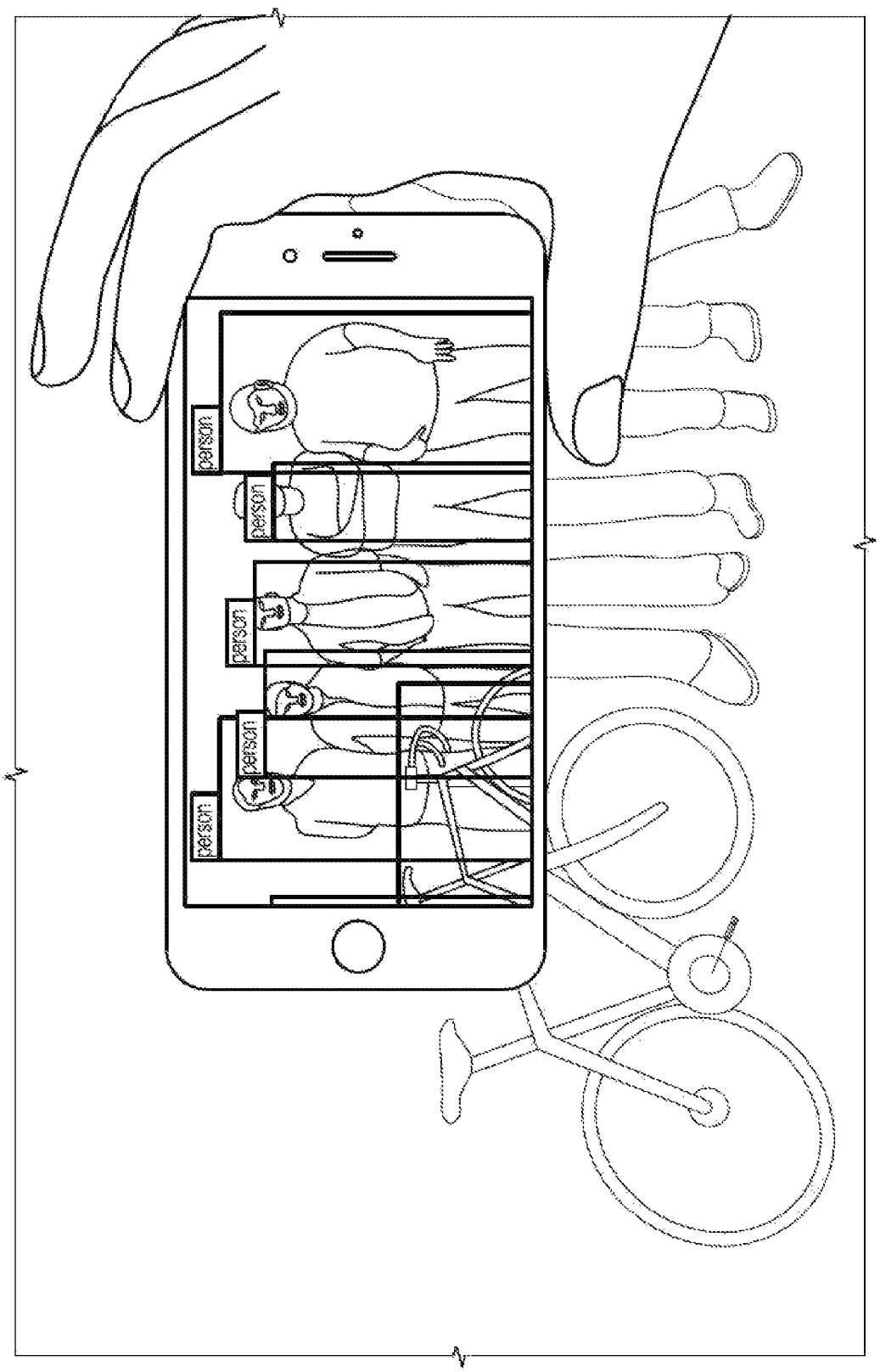
FIG. 3 illustrates an example AI task performed on a mobile device of an end user based on the user specifications defined in the interface of FIG. 1.

Once the one or more interface functions are binded with the model binary, a final software binary (combination of the model binary and the interface function(s)) may be sent to a dispatcher 218, which creates a link 220 for the user to download the final software binary 216 on their device (e.g., client system 430). Upon downloading, the user may incorporate the received binary into their application, which can then be finally released for use by end users. An end user may use the developer's software to perform AI functions. By way of an example, the developer may have developed an object-detection application, for iPhone users, that may utilize 100 MB of memory and 1 JPI of power, and may run at 10 FPS (e.g., as shown in FIG. 1). The end user may use this object-detection application on their iPhone to detect one or more objects in their surrounding environment. For example, as shown in FIG. 3, the application may be used on an iPhone 6 model to detect persons in front of the end user.

In particular embodiments, an automatic-benchmarking component built into the model may automatically evaluate the performance of the model based on, for example, how well the provided model is serving the user needs and the various performance constraints (e.g., how much is the memory and power usage, speed, etc.) associated with the model. The automatic-benchmarking component may report the benchmarked data to the model-management system 200, which may store it in the database 206 of AI models and use it for training the models. In some embodiments, the training of models may also be performed based on feedback provided by a user at query time, as discussed in further detail below.

Figure 2B:
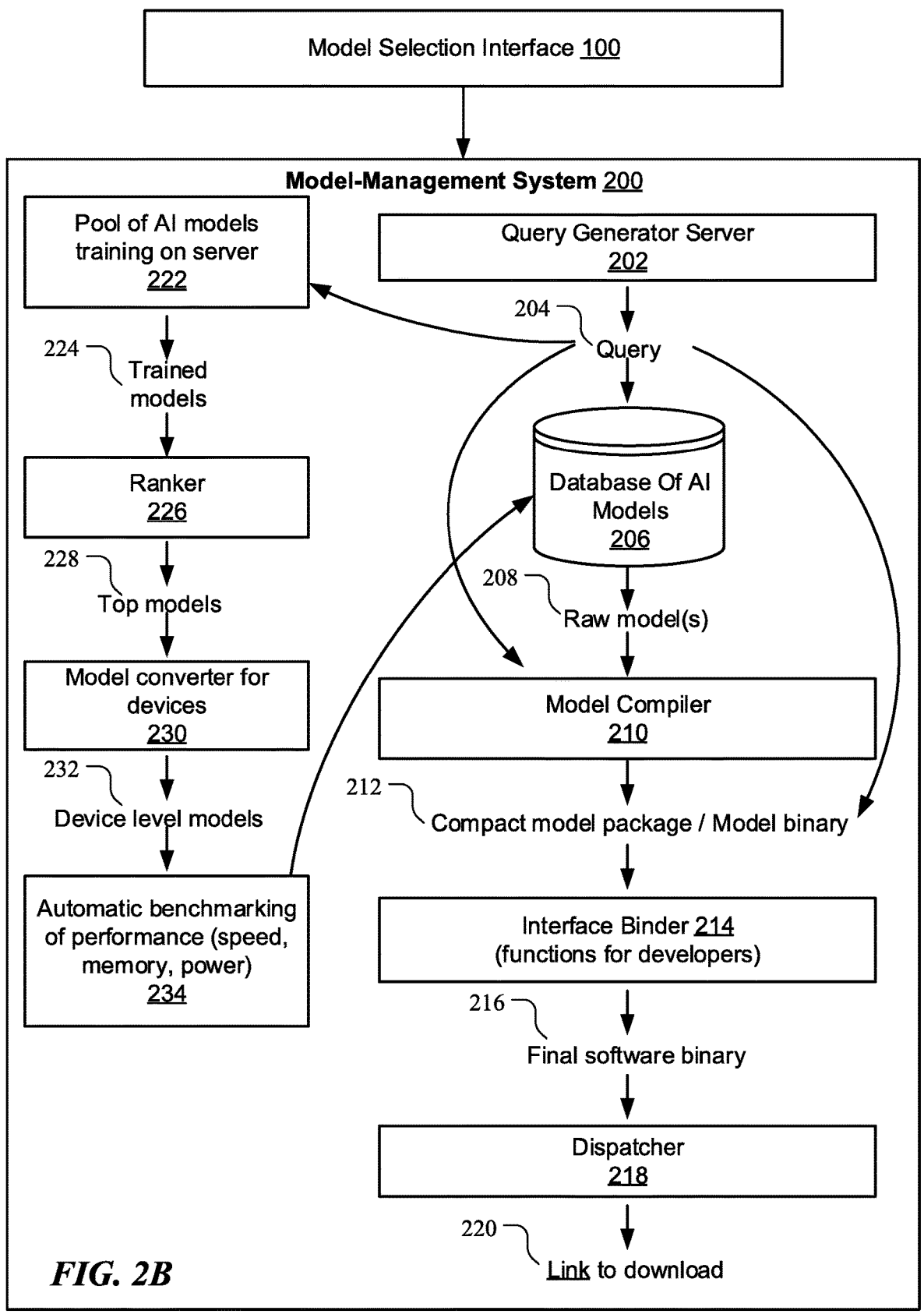
FIG. 2B illustrates additional components of the model-management system and their associated functionalities for training a pool of AI models.

FIG. 2B illustrates additional components of the model-management system 200 and their associated functionalities for training a pool of AI models. Training of models may include improving the performance of the existing models, adding one or more new features to existing models, and/or creating a new model. A user may provide training data at query time or in other words, when the user is defining their specifications using the interface 100. As an example and not by way of limitation, training data may include a request from the user to perform object detection for objects that may not be currently included in the interface 100 but the user may have data corresponding to those objects. The user may then provide their data along with their desired specification to the model-management system 200, which may use this data to refine their existing models relating to object detection to include the new categories of objects provided by the user. As another example, the user may provide their performance feedback for a model (e.g., how well a previous model served their needs in terms of speed, memory and power usage) at query time, and the model-management system 200 may use this performance feedback to train the pool of AI models on server (indicated by reference numeral 222). Other possible ways of training the models are also possible and within the scope of the present disclosure.

The trained AI models 224 may be sent to a ranker 226 for ranking. The ranker 226 may rank the models based on various factors. The factors may include, for example, performance metrics associated with each of the models, benchmark data, user feedback on the models, etc. Based on the ranking, top models 228 may be determined. For example, top five ranked models may be chosen and sent to a model converter 230 for devices. The model converter 230 may convert the top ranked models into device-level models 232 as discussed above. Automatic benchmarking (indicated by reference numeral 234) may be performed for these models in terms of speed, memory, and power constraints, and finally these device-level models along with benchmarked data may be stored in the database 206 of AI models for future access and/or retrieval. In particular embodiments, the steps 222-234 illustrated in FIG. 2B may be performed asynchronously with the steps illustrated in FIG. 2A.

FIG. 3 illustrates an example AI task performed on a mobile device of an end user based on the user specifications defined in the interface of FIG. 1. For instance, as shown in FIG. 1, the user (e.g., developer) selects object detection (e.g., person detection 112) functionality to be integrated into their application that is capable of running on various iPhones 114. The developer may also define that their application with the object detection functionality may utilize 100 MB of memory and 1 JPI of power and may run at 10 FPS. Once these user specifications are integrated into the developer's application, the developer may release their application for use by end users (e.g., consumers). For example, as shown in FIG. 3, an end user/consumer having the developer's application installed on their iPhone may use the application to detect persons in front of them or their surrounding environment simply by holding the phone in a particular direction. This is advantageous for an end user/consumer as the consumer does not need any special or a high-powered computing device and can be able to use AI functionality on their existing devices. Also, this is advantageous for a developer as the developer can easily integrate AI functionality into their applications (e.g., software) just by selecting desired options using the interface 100.

Figure 4:
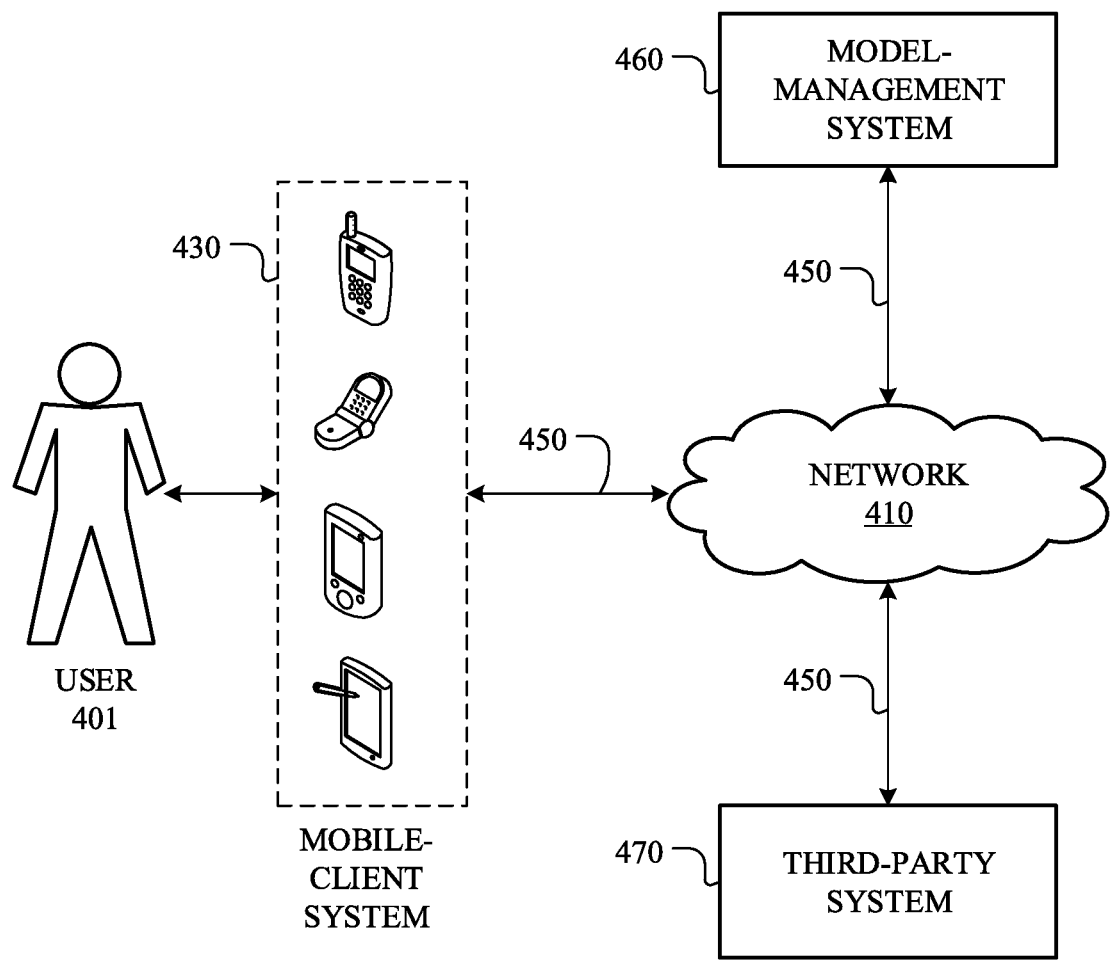
FIG. 4 illustrates an example network environment associated with a model-management system.

FIG. 4 illustrates an example network environment 400 associated with a model-management system. Network environment 400 includes a user 401, a client system 430, a model-management system 460, and a third-party system 470 connected to each other by a network 410. Although FIG. 4 illustrates a particular arrangement of user 401, client system 430, model-management system 460, third-party system 470, and network 410, this disclosure contemplates any suitable arrangement of user 401, client system 430, model-management system 460, third-party system 470, and network 410. As an example and not by way of limitation, two or more of client system 430, model-management system 460, and third-party system 470 may be connected to each other directly, bypassing network 410. As another example, two or more of client system 430, model-management system 460, and third-party system 470 may be physically or logically co-located with each other in whole or in part. Moreover, although FIG. 4 illustrates a particular number of users 401, client systems 430, model-management systems 460, third-party systems 470, and networks 410, this disclosure contemplates any suitable number of users 401, client systems 430, model-management systems 460, third-party systems 470, and networks 410. As an example and not by way of limitation, network environment 400 may include multiple users 401, client system 430, model-management systems 460, third-party systems 470, and networks 410.

In particular embodiments, user 401 may be an individual (human user) such as an application/software developer, an entity (e.g., an enterprise, business, or third-party application), or a group (e.g., of individuals or entities) that interacts or communicates with or over model-management system 460. In particular embodiments, model-management system 460 may be a network-addressable computing system for managing (e.g., creating, updating, training, etc.) a plurality of AI models. Model-management system 460 may be accessed by the other components of network environment 400 either directly or via network 410. In particular embodiments, model-management system 460 may include an authorization server (or other suitable component(s)) that allows users 401 to opt in to or opt out of having their actions logged by model-management system 460 or shared with other systems (e.g., third-party systems 470), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of model-management system 460 through blocking, data hashing, anonymization, or other suitable techniques as appropriate. Third-party system 470 may be accessed by the other components of network environment 400 either directly or via network 410. In particular embodiments, one or more users 401 may use one or more client systems 430 to access, send data to, and receive data from model-management system 460 or third-party system 470. Client system 430 may access model-management system 460 or third-party system 470 directly, via network 410, or via a third-party system. As an example and not by way of limitation, client system 430 may access third-party system 470 via model-management system 460. Client system 430 may be any suitable computing device, such as, for example, a personal computer, a laptop computer, a cellular telephone, a smartphone, a tablet computer, or an augmented/virtual reality device.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, model-management system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

Figure 5:
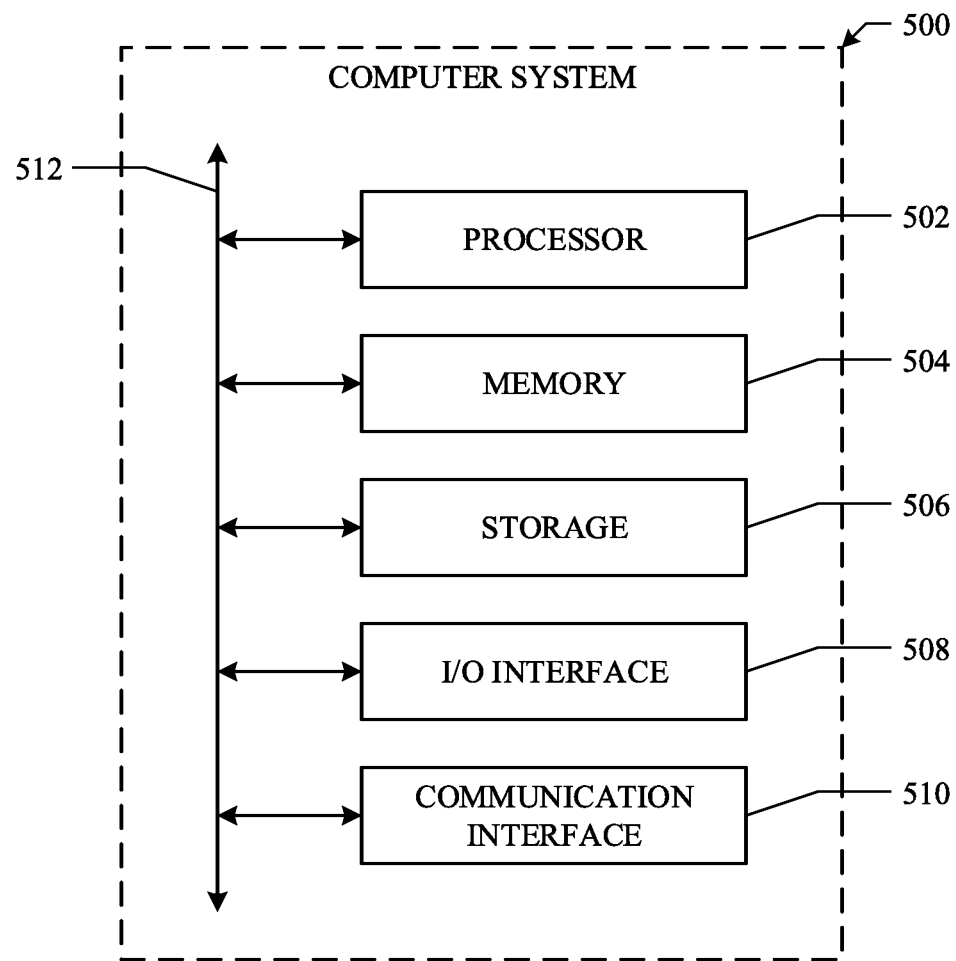
FIG. 5 illustrates an example computer system.

FIG. 5 illustrates an example computer system 500. In particular embodiments, one or more computer systems 500 perform one or more steps of one or more methods described or illustrated in reference to at-least FIGS. 2A and 2B. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   providing, to a client system of a user, a user interface for display, the user interface comprising a first set of options for selecting an artificial intelligence (AI) task for integration into a user application, a second set of options for selecting one or more devices on which the user wants to deploy the selected AI task, and a third set of options for selecting one or more performance constraints specific to the selected devices;
   receiving, from the client system of the user, user specifications based on user selections in the first set of options, the second set of options, and the third set of options;
   generating a custom AI model based on the user specifications; and
   sending, to the client system of the user, the custom AI model for integrating into the user application, wherein the custom AI model once integrated enables the user application to perform the selected AI task on the selected devices.

2. The method of claim 1, wherein generating the custom AI model based on the user specifications comprises:
   retrieving a high-level model from a database comprising a plurality of AI models, wherein the plurality of AI models was generated and stored in the database based on prior user specifications;
   compiling the high-level model based on the user specifications to generate a model binary;
   binding one or more interface functions with the model binary, wherein the one or more interface functions are functions associated with the selected AI task; and
   converting the model binary into a device-level model that is configured to operate on the devices selected by the user.

3. The method of claim 2, wherein sending the custom AI model comprises sending, to the client system of the user, a downloadable link to download the device-level model into the client system, wherein the device-level model once downloaded integrates one or more functionalities associated with the selected AI task into the user application.

4. The method of claim 2, wherein compiling the high-level model comprises removing unnecessary components from the high-level model and adding one or more components as per the user specifications.

5. The method of claim 2, further comprising:
   receiving, from the client system of the user, benchmark data associated with the custom AI model; and
   training the plurality of AI models based on the benchmark data.

6. The method of claim 5, wherein training the plurality of AI models comprises:
improving the performance of the AI models;
adding one or more features to the AI models; or
creating a new AI model and storing the new AI model in the database.

7. The method of claim 5, wherein the benchmark data comprises user performance feedback on the custom AI model, the user performance feedback indicating how well the custom AI model served the user needs in terms of speed, memory, and power usage.

8. The method of claim 7, further comprising:
ranking the plurality of AI models based on performance metrics associated with each of the models, the performance metrics comprising the benchmark data;
selecting a top N models from the plurality of AI models based on the ranking;
converting the top N models into device-level models;
performing automatic benchmarking on the device-level models in terms of speed, memory, and power constraints; and
storing the device-levels models in the database for future access or retrieval.

9. The method of claim 1, wherein the AI task comprises one or more of object detection, scene recognition, image tagging, image enhancement, object segmentation, action recognition, speech recognition, or text recognition.

10. The method of claim 1, wherein the devices comprise one or more of smartphones, tablets, wearable devices, embedded sensors, cameras, or drones.

11. The method of claim 1, wherein the one or more performance constraints comprise:
a memory constraint;
a latency constraint; or
a power constraint.

12. The method of claim 11, wherein the memory constraint enables the user to specify amount of memory to be used for the selected AI task.

13. The method of claim 11, wherein the latency constraint enables the user to specify a refresh rate or frames per second (FPS) at which the user wants the selected AI task to run on the selected devices.

14. The method of claim 11, wherein the power constraint enables the user to specify amount of power to be utilized by the selected AI task.

15. The method of claim 1, wherein each of the first set of options, the second set of options, or the third set of options comprises sub-options for enabling a granular level of user selection.

16. One or more computer-readable non-transitory storage media embodying software that is operable when executed to:
provide, to a client system of a user, a user interface for display, the user interface comprising a first set of options for selecting an artificial intelligence (AI) task for integrating into a user application, a second set of options for selecting one or more devices on which the user wants to deploy the selected AI task, and a third set of options for selecting one or more performance constraints specific to the selected devices;
receive, from the client system of the user, user specifications based on user selections in the first set of options, the second set of options, and the third set of options;
generate a custom AI model based on the user specifications; and
send, to the client system of the user, the custom AI model for integrating into the user application, wherein the custom AI model once integrated enables the user application to perform the selected AI task on the selected devices.

17. The computer-readable non-transitory storage media of claim 16, wherein generating the custom AI model based on the user specifications comprises:
retrieving a high-level model from a database comprising a plurality of AI models, wherein the plurality of AI models was generated and stored in the database based on prior user specifications;
compiling the high-level model based on the user specifications to generate a model binary;
binding one or more interface functions with the model binary, wherein the one or more interface functions are functions associated with the selected AI task; and
converting the model binary into a device-level model that is configured to operate on the devices selected by the user.

18. The computer-readable non-transitory storage media of claim 17, wherein sending the custom AI model comprises sending, to the client system of the user, a downloadable link to download the device-level model into the client system, wherein the device-level model once downloaded integrates one or more functionalities associated with the selected AI task into the user application.

19. The computer-readable non-transitory storage media of claim 17, wherein compiling the high-level model comprises removing unnecessary components from the high-level model and adding one or more components as per the user specifications.

20. A system comprising: one or more processors; and a non-transitory memory coupled to the processors comprising instructions executable by the processors, the processors operable when executing the instructions to:
provide, to a client system of a user, a user interface for display, the user interface comprising a first set of options for selecting an artificial intelligence (AI) task for integrating into a user application, a second set of options for selecting one or more devices on which the user wants to deploy the selected AI task, and a third set of options for selecting one or more performance constraints specific to the selected devices;
receive, from the client system of the user, user specifications based on user selections in the first set of options, the second set of options, and the third set of options;
generate a custom AI model based on the user specifications; and
send, to the client system of the user, the custom AI model for integrating into the user application, wherein the custom AI model once integrated enables the user application to perform the selected AI task on the selected devices.

* * * * *